(12) United States Patent
Liu et al.

(10) Patent No.: US 9,928,873 B1
(45) Date of Patent: Mar. 27, 2018

(54) HEAD-DISK CONTACT DETECTION USING A THERMAL SENSOR FOR MODULATION AIR BEARINGS

(71) Applicant: Seagate Technology LLC, Cupertino, CA (US)

(72) Inventors: Dongming Liu, Eden Prairie, MN (US); Huazhou Lou, Eden Prairie, MN (US); Eric John McCalla, Watertown, MN (US); James Robert Oscarson, Bloomington, MN (US); Shawn S. Silewski, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/638,839

(22) Filed: Jun. 30, 2017

(51) Int. Cl.
| | | |
|---|---|---|
| *G11B 21/02* | (2006.01) | |
| *G11B 21/21* | (2006.01) | |
| *G11B 23/50* | (2006.01) | |
| *G11B 5/40* | (2006.01) | |
| *G11B 5/60* | (2006.01) | |
| *G11B 7/122* | (2012.01) | |
| *G11B 5/00* | (2006.01) | |
| *G11B 5/31* | (2006.01) | |

(52) U.S. Cl.
CPC ............... *G11B 21/21* (2013.01); *G11B 5/40* (2013.01); *G11B 5/6064* (2013.01); *G11B 7/122* (2013.01); *G11B 23/507* (2013.01); *G11B 5/3106* (2013.01); *G11B 5/6082* (2013.01); *G11B 2005/0016* (2013.01)

(58) Field of Classification Search
CPC . G11B 5/59633; G11B 5/6005; G11B 5/6076; G11B 5/607; G11B 5/314; G11B 5/6017; G11B 5/6088; G11B 11/1058; G11B 11/10558; G11B 2005/0021; G11B 2220/2525
USPC ...................... 360/59, 75, 313, 31, 62, 324.2
See application file for complete search history.

(56) References Cited

U.S. PATENT DOCUMENTS

| | | | |
|---|---|---|---|
| 7,872,471 B2 * | 1/2011 | Yamanaka | G01R 33/1207 324/210 |
| 8,830,614 B2 | 9/2014 | Garzon et al. | |
| 8,995,076 B1 | 3/2015 | Olson et al. | |
| 9,047,898 B2 | 6/2015 | Liu et al. | |
| 9,093,084 B2 | 7/2015 | Peng et al. | |
| 9,437,234 B1 | 9/2016 | Kim et al. | |
| 9,607,642 B1 | 3/2017 | Yang et al. | |
| 2007/0127147 A1 | 6/2007 | Yokohata et al. | |
| 2016/0232931 A1 | 8/2016 | Lou et al. | |
| 2017/0092313 A1 | 3/2017 | Olson et al. | |

* cited by examiner

*Primary Examiner* — Nabil Hindi
(74) *Attorney, Agent, or Firm* — Hollingsworth Davis, LLC

(57) ABSTRACT

An apparatus comprises a slider configured for writing data to and reading data from a magnetic recording medium and for heat-assisted magnetic recording. The slider comprises a heater configured to receive an AC signal and to cause oscillation in a spacing between the slider and the medium, and a contact sensor situated on the slider and configured to produce a DC response signal. A detector is coupled to the slider and configured to measure an amplitude of a spike in the DC response signal, calculate a ratio between the spike amplitude and an amplitude of the DC response signal, and detect contact between the slider and the medium in response to the ratio exceeding a predetermined threshold.

21 Claims, 8 Drawing Sheets

Spike / dR/dP Amplitude
before De-Trending

Spike / dR/dP Amplitude
after De-Trending

HEAD-DISK CONTACT DETECTION USING A THERMAL SENSOR FOR MODULATION AIR BEARINGS

SUMMARY

Embodiments are directed to a method comprising moving a magnetic recording slider relative to a magnetic recording medium, and supplying AC power to a heater of the slider to cause oscillation in a spacing between the slider and the medium and to cause the slider to approach the medium. The method comprises measuring an amplitude of DC response signals produced by a contact sensor of the slider as the slider approaches the medium, and measuring an amplitude of a spike in the DC response signals. The method also comprises calculating a ratio between the spike amplitude and the amplitudes of the DC response signals, and detecting contact between the slider and the medium in response to the ratio exceeding a predetermined threshold.

Embodiments are directed to an apparatus comprising a slider configured for writing data to and reading data from a magnetic recording medium and for heat-assisted magnetic recording. The slider comprises a heater configured to receive an AC signal and to cause oscillation in a spacing between the slider and the medium, and a contact sensor situated on the slider and configured to produce a DC response signal. A detector is coupled to the slider and configured to measure an amplitude of a spike in the DC response signal, calculate a ratio between the spike amplitude and an amplitude of the DC response signal, and detect contact between the slider and the medium in response to the ratio exceeding a predetermined threshold.

Embodiments are directed to an apparatus comprising a slider configured for writing data to and reading data from a magnetic recording medium and for heat-assisted magnetic recording. The slider comprises a heater configured to receive an AC signal and to cause oscillation in a spacing between the slider and the medium, and a contact sensor situated on the slider and configured to produce a DC response signal. A detector is coupled to the slider and configured to calculate an amplitude of a dR/dP curve developed using the DC response signals, where dR is a change in resistance of the contact sensor and dP is a change in heater power. The detector is configured to measure an amplitude of a spike in the DC response signal, calculate the ratio as a ratio between the spike amplitude and the amplitude of the dR/dP curve, and detect a minima of the dR/dP curve. The detector is also configured to detect contact between the slider and the medium in response to either the ratio exceeding the predetermined threshold or detecting the minima of the dR/dP curve.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
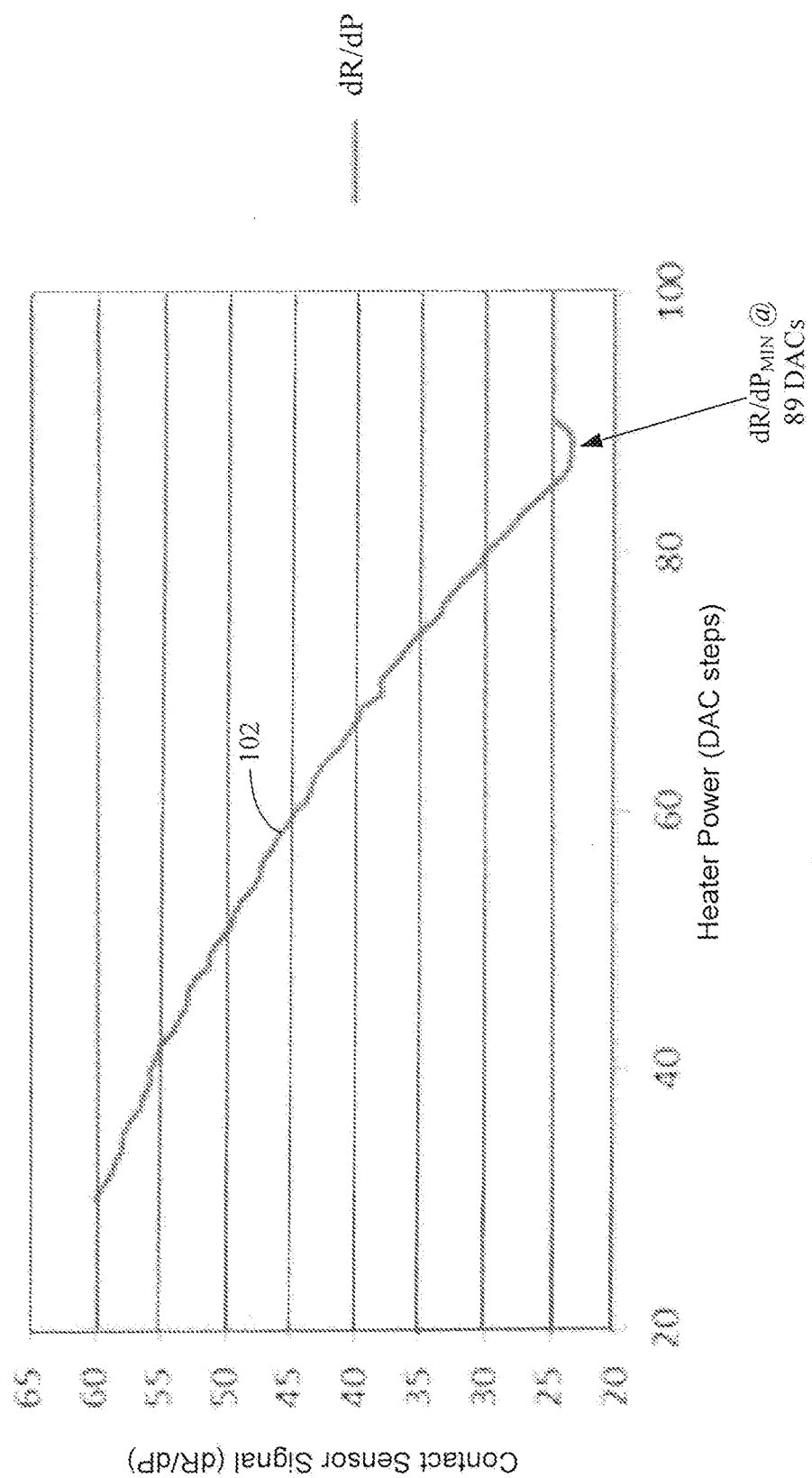
FIG. 1 illustrates a contact sensor signal which decreases as heater power of a slider is increased in accordance with some contact detection methodologies.

A transducer of a magnetic storage device includes components for recording information to and reading information from a magnetic recording medium. The transducer is usually housed within a small ceramic block called a slider. Sliders are aerodynamically designed to fly on a cushion of air that is generated due to rotating a magnetic recording disk at high speeds. The slider has an air bearing surface (ABS) that may include rails and a cavity or depression between the rails. The ABS is that surface of the slider nearest to the disk as the disk is rotating. Air is dragged between the rails and the disk surface causing an increase in pressure that tends to force the head away from the disk. Air is simultaneously rushing past the cavity or depression in the ABS which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the slider's ABS surface. During operation of a hard disk drive, the distance between the slider and the disk is very small, on the order of several nanometers.

For accurate write and read operations to occur, it is desirable to have a relatively small distance or spacing between a slider and its associated magnetic recording medium. This distance or spacing is known head-disk spacing, which is interchangeable with the term fly height. By reducing the fly height, a slider is typically better able to both write and read data to and from a medium. Reducing the fly height also allows for surveying of recording medium topography, such as for detecting asperities and other features of the recording medium surface. Head-disk contact detection and/or head-disk spacing sensing technologies contribute to the performance and reliability of magnetic storage systems. Higher contact detection repeatability enables lower active clearance, and thus higher recording density. Higher contact detection sensitivity reduces wear and improves reliability.

Good performance of the head disk drive results when a slider is flown as closely to the surface of a disk as possible. An important function of a hard disk drive is to accurately set the clearance between the slider and the surface of the magnetic storage medium. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the recording medium during operation.

Contact detection may be performed before the head-disk system begins any type of recording. Contact detection may be performed on a head-by-head basis and can require significant interaction time between head and disk. Many systems implement a contact detection scheme which involves determining the heater power necessary to cause thermal expansion of the slider from a passive fly condition to intermittent head-disk contact. This intermittent contact may cause significant modulation of the slider fly height. The modulation of slider fly height then results in modulation of heat transfer between the head and disk. A contact sensor, such as a dual ended temperature coefficient of resistance (DETCR) sensor, can readily pick up these relatively large fluctuations in head-disk heat transfer. The readings from the contact sensor in combination with the heater power can be used to establish contact detection.

Recently developed low clearance technology (LCT) head-disk systems have reduced or eliminated fly height modulation due to intermittent head-disk contact. The reduction/elimination of fly height modulation due to a relatively stiff air bearing has beneficially resulted in the reduced wear of the slider during contact detection and unintended head-disk interaction. However, it has also resulted in the reduction of contact detection strength by the sensors and/or techniques that rely on the fly height modulation. As such, in response to the contact detect challenges presented by LCT head-disk systems, a low-frequency AC heater (LFACH) contact detection scheme has been developed. In accordance with an LFACH contact detection approach of the present disclosure, the amplitude of the heater voltage/power follows an oscillation that causes the slider fly height to follow the same oscillation. Oscillations in clearance will cause oscillating changes in ABS pressure and ABS heat transfer. The DETCR or other contact sensor of the slider detects the oscillation and produces an oscillating sensor signal, which when combined with the heater power can be used to determine the contact detect. The combined contact sensor signal and heater power metric used in LFACH contact detection is referred to herein as dR/dP, where dR is the change in resistance of the contact sensor (e.g., a DETCR) and dP is the change in heater power.

The above-described LFACH contact detection approach is effective for non-modulation and low-modulation air bearings (or head-disk interfaces (HDIs)), such as those employed in heat-assisted magnetic recording (HAMR) devices. Recent improvements in HAMR head thermal mechanical design and media roughness, however, have resulted in an increase in modulation when the HAMR head makes contact with the recording medium. For HAMR devices with modulating air bearings (HDIs), current LFACH contact detection approaches may not be capable of detecting head-disk contact, particularly at certain disk locations (e.g., middle diameter locations).

While traditional contact detectors (e.g., those that utilize a position error signal) can be used to detect head-disk contact for modulating air bearings, they are not suitable for use with non-modulation and low-modulation air bearings, and have other shortcomings. Such traditional contact detectors would need to be supplemented with an additional contact sensor and detection scheme for performing contact detection for non-/low-modulation air bearings, thus adding complexity, revolutions of head-disk contact, and an in increase in slider burnish risk.

FIG. 1 illustrates a contact sensor signal which decreases as heater power of a slider is increased in accordance with a traditional LFACH contact detection methodology that utilizes a DC DETCR. The contact sensor signal is given in terms of dR/dP, and is represented by curve 102. As can be seen in FIG. 1, the metric dR/dP (curve 102) decreases generally linearly with decreasing head-to-disk clearance. Detecting a deviation from linearity in dR/dP and a minima ($dR/dP_{MIN}$) indicates head-media contact and head-media caused cooling and frictional heating. A detector evaluates the dR/dP curve 102 to detect a minima of the curve 102, indicated by $dR/dP_{MIN}$ in FIG. 1. In order to detect the minima of the dR/dP curve 102, a typical dR/dP detector needs the heater to sweep a few DAC (digital-to-analog converter) steps past the head-disk contact that occurs at the minima, $dR/dP_{MIN}$.

For a modulating air bearing, increasing the heater by one step into head-disk contact can result in a large spike in the contact sensor signal (e.g., the DC response of a DETCR). This spike is often out of the measurement range of the detector (e.g., causing saturation of the preamplifier). When a large spike in the contact sensor signal occurs, the dR/dP calculation cannot be performed accurately and often results in repeated data collection while the slider continues to contact the disk. Burnishing of the slider components at the ABS often occurs as the result of the inability of the dR/dP detector to declare contact when a spike occurs. Moreover, the dR/dP detector will attempt a so-called DC Cancel procedure to bring the contact sensor signal back into range if the signal is hitting either the top or bottom of the range measurable by the ADC (analog-to-digital converter) of the preamplifier. The DC Cancel procedure subjects the slider to repeated head-disk contact and an increased risk of burnishing. Embodiments of the disclosure are directed to a contact detection methodology that can declare head-disk contact earlier than traditional approaches (e.g., traditional LFACH methodologies). Early head-disk contact detection serves to reduce repeated contact between the slider and the disk, as well as slider burnishing. A contact detection methodology of the present disclosure eliminates the need for a DC-Cancel procedure required by traditional LFACH methodologies.

Embodiments of the disclosure are directed to a contact detection methodology that detects head-disk contact in response to detecting a spike in the response of a contact sensor signal. Detecting head-disk contact in response to detecting a spike in the response of a contact sensor signal is particularly well suited for use with a modulating air bearing, such as that of recently improved HAMR devices. Spike detection of the present disclosure can be integrated with traditional LFACH methodologies to provide for enhanced (e.g., early) head-disk contact detection, and can run concurrently or sequentially with other LFACH detection procedures.

Particular embodiments are directed to a contact detection approach that employs a DC biased DETCR (DC DETCR) for use with a modulating air bearing. Some embodiments are directed to a contact detection approach that uses a contact sensor, such as a DC DETCR, for both modulating and non-/low-modulation air bearings. Other embodiments are directed to a contact detection approach that uses a contact sensor, such as a DC DETCR, to provide signals to two disparate and concurrently running (or sequentially executed) contact detection procedures. For example, one of the contact detection procedure can operate on a spike in the contact sensor signal, while a second contact detection procedure can operate on a minima of a dR/dP curve. Each of the concurrently running (or sequentially executed) contact detection procedures can be effective for detecting head-disk contact at different locations (e.g., outer diameter, inner diameter, middle diameter) of the disk and across a range of air bearings with varying stiffness.

Figure 2:
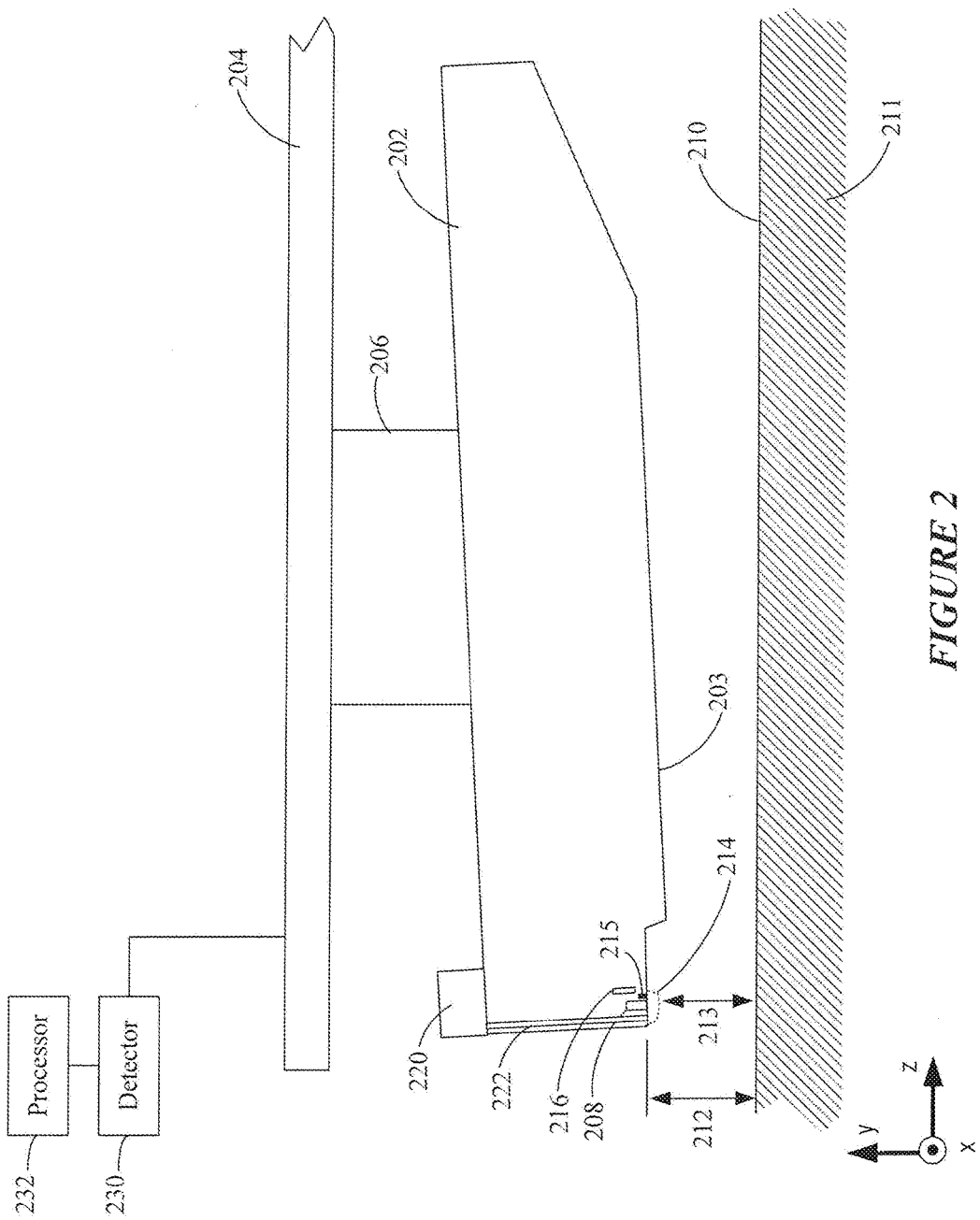
FIG. 2 shows a side view of a magnetic recording slider with which embodiments of the present disclosure can be implemented.

FIG. 2 shows a side view of a slider 202 configured for magnetic recording according to a representative embodiment. In some embodiments, the slider 202 is configured for heat-assisted magnetic recording (HAMR). The slider 202 may be used in a magnetic data storage device, e.g., a hard disk drive (a conventional or HAMR disk drive). The slider 202 is coupled to an arm 204 by way of a suspension 206 that allows some relative motion between the slider 202 and arm 204. The slider 202 includes read/write heads 208 at a trailing edge that are held proximate to a surface 210 of a magnetic recording medium 211, e.g., magnetic disk. In HAMR embodiments, the slider 202 further includes a laser 220 and a waveguide 222. The waveguide 222 delivers light from the laser 220 to components (e.g., a near-field transducer) near the read/write heads 208.

When the slider 202 is located over surface 210 of recording medium 211, a flying height 212 is maintained between the slider 202 and the surface 210 by a downward force of arm 204. This downward force is counterbalanced by an air cushion that exists between the surface 210 and an air bearing surface 203 (also referred to as a "media-facing surface") of the slider 202 when the recording medium 211 is rotating. It is desirable to maintain a predetermined slider flying height 212 over a range of disk rotational speeds during both reading and writing operations to ensure consistent performance. Region 214 is a "close point" of the slider 202, which is generally understood to be the closest spacing between the read/write heads 208 and the magnetic recording medium 211, and generally defines the head-to-disk spacing 213.

To account for both static and dynamic variations that may affect slider flying height 212, the slider 202 may be configured such that a region 214 of the slider 202 can be configurably adjusted during operation in order to finely adjust the head-to-disk spacing 213. This is shown in FIG. 2 by a dotted line that represents a change in geometry of the region 214. In this example, the geometry change may be induced, in whole or in part, by an increase or decrease in temperature of the region 214 via a heater 216. The heater 216 can be representative of a reader heater or a writer heater. A contact sensor 215, such as a DC DETCR, is shown situated at or near the close point 214 (e.g., adjacent the read/write heads 108, such as near the write head or the read head) or can be positioned at another location of an air bearing surface 203 of the slider 202.

According to various embodiments, a contact sensor 215 of the slider 202 can have a resistance that changes as a function of temperature. For example, the contact sensor 215 (e.g., a wire) can be formed from a material having a high temperature coefficient of resistance (TCR).

Materials having a relatively high TCR provide for enhanced temperature and temperature change sensing by the contact sensor. Suitable materials include, but are not limited, metals such as Pt, Ru, Cu, Au, Al, W, Ni, NiFe, and Mo. Other non-metal materials may also be used, such as carbon nanotubes, indium tin oxide (ITO), Poly(3,4-ethylenedioxythiophene) (PEDOT), poly(styrene sulfonate) PSS, and graphene.

According to some embodiments, a detector 230, which may incorporate or be coupled to a processor 232, is configured to measure the rate of change in resistance (dR) of the contact sensor 215 and the rate of change in power (dP) of the heater 216. The change in resistance and the change in heater power can be used to produce a detection metric by the detector 230. For example, using the ratio of the rate of change in resistance (dR) to the rate of change in heater power (dP), referred to herein as dR/dP, changes in head-disk spacing and head-disk contact can be detected. In various embodiments, the detector 230 is configured to detect a spike in the contact sensor signal that can arise due to head-disk contact. It is noted that detecting this spike is currently not possible using a traditional LFACH approach. In some embodiments, the detector 230 is configured to detect a spike in the contact sensor signal and, in addition, detect a minima of dR/dP data indicative of head-disk contact (e.g., spike detection and dR/dP detection of a traditional LFACH methodology). A detector 230 that operates on both a spike in the contact sensor signal and a dR/dP minima provides for robust head-disk contact detection for modulating and non-/low-modulation air bearings using a common contact sensor (e.g., a DC DETCR) of the slider.

Figure 3:
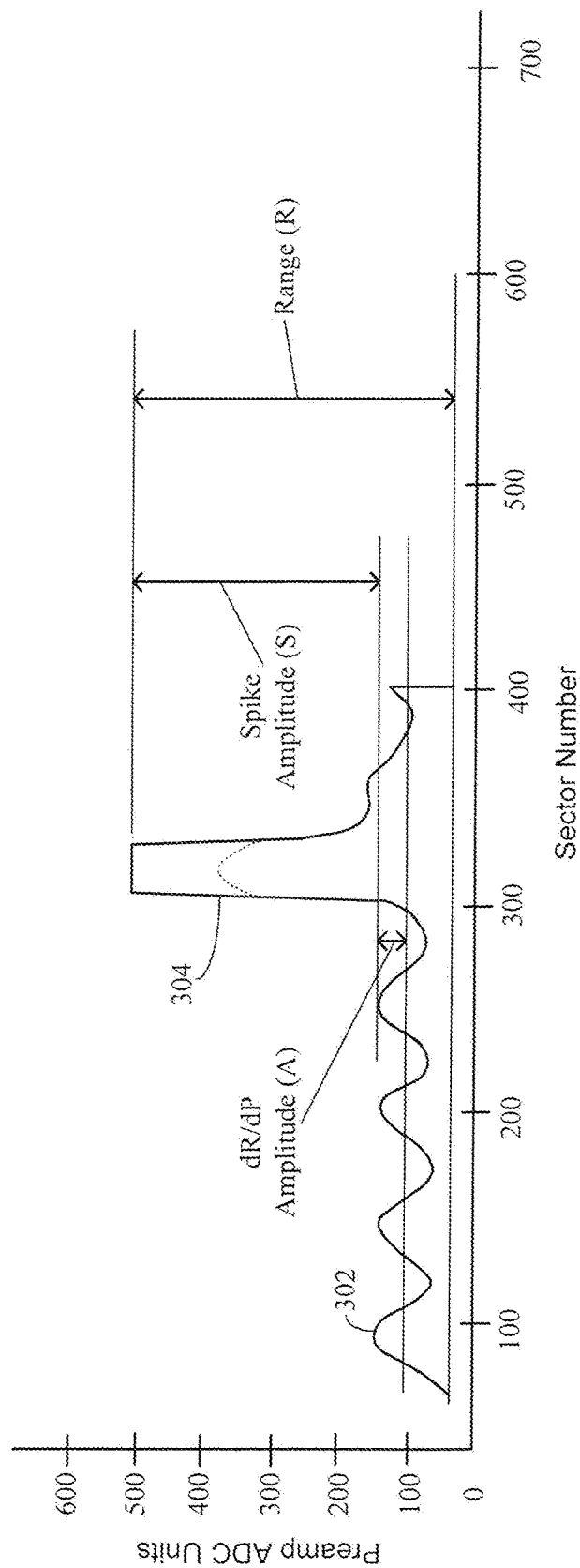
FIG. 3 is an illustration of a contact sensor signal produced by a contact sensor of a HAMR slider prior to and at the moment of head-disk contact for a modulating air bearing in accordance with various embodiments.

FIG. 3 is an illustration of a contact sensor signal produced by a DC DETCR of a HAMR slider prior to and at the moment of head-disk contact for a modulation air bearing in accordance with various embodiments. The contact sensor signal 302 is shown as an oscillating dR/dP signal or curve. FIG. 3 shows a number of dR/dP oscillations prior to a head-disk contact event, which occurs at around sector number 300. The dR/dP signal 302 has an amplitude, A, which can be a center-to-peak amplitude of the signal 302. In some embodiments, the peak-to-peak amplitude of the signal 302 can be used. When a head-disk contact event occurs, an instantaneous increase in the amplitude of the contact sensor signal produced by the DC DETCR results, which is referred to herein as a spike 304.

As is shown in FIG. 3, the spike 304 arises from the top of the oscillating dR/dP signal 302. The spike 304, which is the response of the DC DETCR to head-disk contact, can have an amplitude that ranges between the peak (maximum) of the dR/dP signal 302 and the maximum measurable DC DETCR signal amplitude prior to preamplifier saturation. In FIG. 3, the peak of the spike 304 is shown clipped at the maximum measurable DC DETCR signal amplitude, indicating that the preamplifier reached saturation. As indicated above, the spike 304 can have an amplitude less than the saturation amplitude of the preamplifier, as indicated by the dashed line in FIG. 3. For example, a spike 304 can occur due to contact between the slider and an asperity or a high point of the disk, and this spike 304 can have an amplitude less than the maximum DC DETCR signal amplitude that is measureable by the ADC of the preamplifier.

The amplitude of the spike 304 can be measured in various ways. One way to measure the amplitude of the spike 304 is to subtract the amplitude, A, of the dR/dP signal 302 from the measurable range, R, of the DC DETCR signal. The spike amplitude, S, can be calculated as $S=R-2*A$, where A represents the center-to-peak amplitude of the dR/dP signal 302. According to various embodiments, the ratio between the spike amplitude, S, and the dR/dP signal amplitude, A, is used as a metric for detecting head-disk contact events. This S/A ratio will experience a sudden jump when the spike 304 arises. If the S/A ratio exceeds a predetermined threshold, head-disk contact is declared. It is noted that the spike 304 is not evident in the dR/dP signal 302 for a head-disk contact event due to windowing of data that smooths out the spike 304. For example, and with reference to FIG. 1, the dR/dP curve 102 shows no such spike at or around the minima, $dR/dP_{MIN}$.

Notably, head-disk contact events can be detected using the S/A ratio earlier than when using the minima of the dR/dP signal 302, which reduces repeated head-disk contact and slider burnishing. An experiment was performed to demonstrate this early detection aspect when using the S/A ratio. In the experiment, and with reference to FIG. 1, the reader heater of the slider was oscillating 6 DAC steps (digital-to-analog-converter steps of the reader heater) at 1800 Hz. It is noted that 1 DAC step can be the equivalent of about 0.7 mW to 0.9 mW of heater power. The dR/dP signal 302 reached a minima ($dR/dP_{MIN}$) at 89 DAC steps. However, the dR/dP detector would often trigger at more than 3 DAC steps passed the minima (at 92 DACs). In other words, the dR/dP detector required the heater to increase by 3 additional DAC steps in order to detect the minima. Each of these additional DAC steps resulted in repeated contact between the slider and the disk.

However, one large spike was observed on top of the dR/dP signal (see FIG. 3) at DAC step 90, which is just one DAC step past the minima at 89 DAC steps. A sudden jump in the S/A ratio occurs at DAC step 90 as a result of the spike. A spike detection methodology of the present disclosure is based on the same DC DETCR signal that is used by the dR/dP detector, but can detect the spike at DAC step 90, which is 2 DAC steps earlier than the dR/dP detector. A two DAC earlier contact declaration can significantly reduce the risk of slider burnishing during contact detection when setting clearance for a slider.

Figure 4:
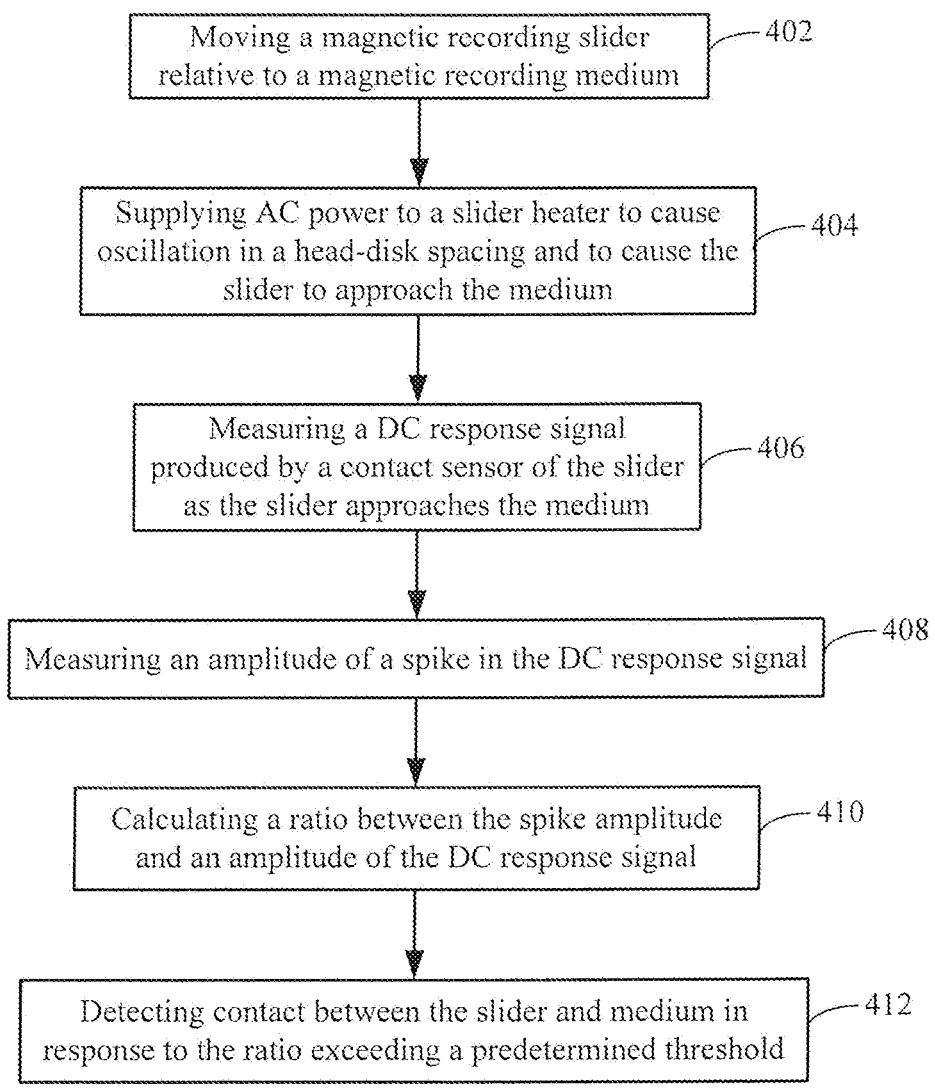
FIG. 4 is a flowchart illustrating various processes of a head-disk contact detection method in accordance with various embodiments.

FIG. 4 is a flowchart illustrating various processes of a head-disk contact detection method in accordance with various embodiments. The method shown in FIG. 4 involves moving 402 a magnetic recording slider relative to a magnetic recording medium. The method involves supplying 404 AC power to a heater of the slider to cause oscillation in head-disk spacing and to cause the slider to approach the medium. The method also involves measuring 406 a DC response signal produced by the contact sensor of the slider as the slider approaches the medium. The method involves measuring 408 an amplitude of a spike in the DC response signal and calculating 410 a ratio between the spike amplitude and an amplitude of the DC response signal. The method also involves detecting 412 contact between the slider and the medium in response to the ratio exceeding a predetermined threshold.

Figure 5:
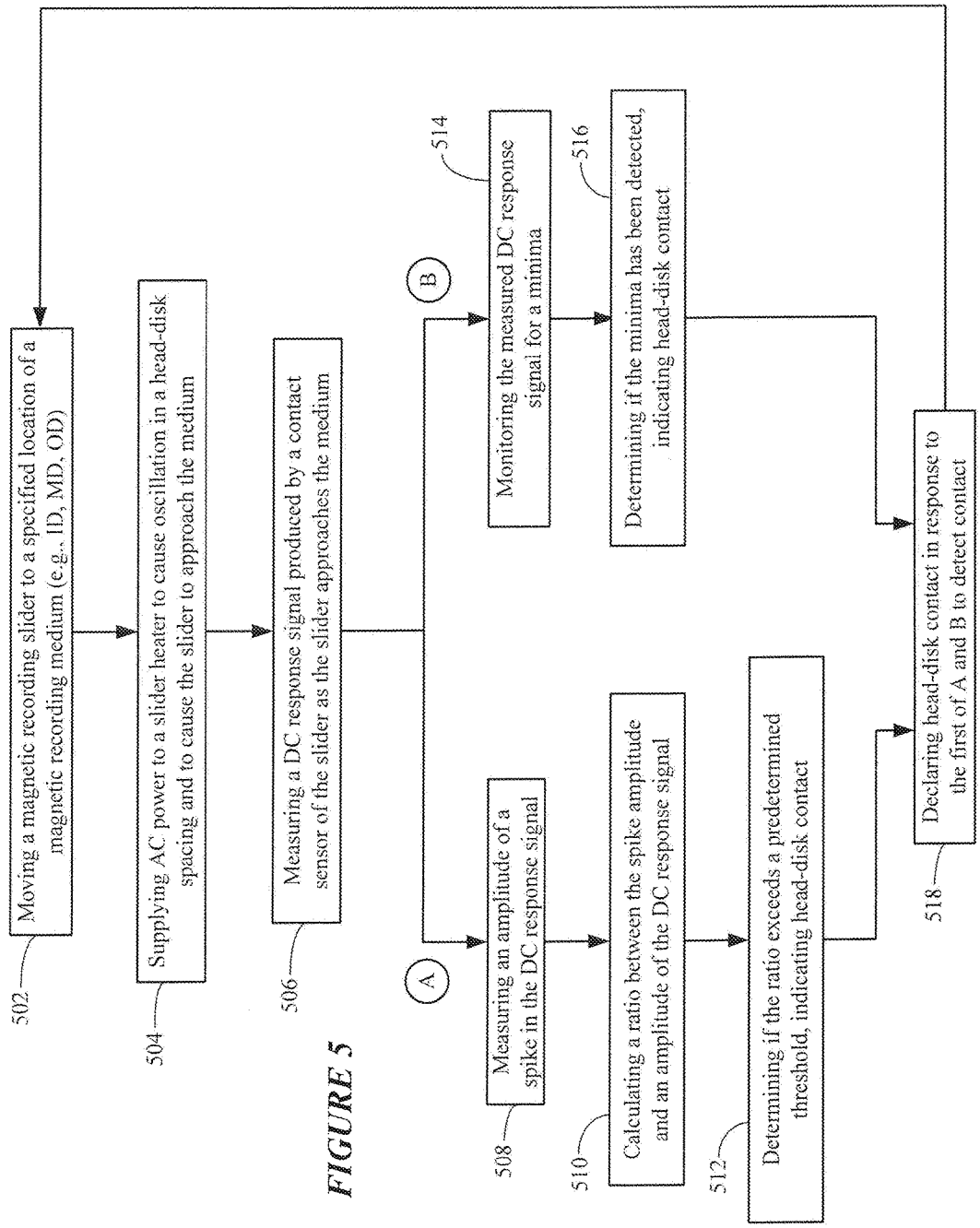
FIG. 5 is a flowchart illustrating various processes of a head-disk contact detection method in accordance with various embodiments.

FIG. 5 is a flowchart illustrating various processes of a head-disk contact detection method in accordance with various embodiments. The method shown in FIG. 5 involves moving 502 a magnetic recording slider to a specified location of a magnetic recording medium. For example, the slider may be moved to an inner diameter (ID), a middle diameter (MD) or an outer diameter (OD) location of the medium where contact detection is to be performed. The method involves supplying 504 AC power to a heater of the slider to cause oscillation in head-disk spacing and to cause the slider to approach the medium. The method involves measuring 506 a DC response signal produced by a contact sensor of the slider as the slider approaches the medium.

According to the embodiment shown in FIG. 5, two disparate contact detection procedures (procedures A and B) can be performed using the DC response signal produced by the contact sensor. In some embodiments, procedures A and B are performed concurrently. In other embodiments, procedures A and B can be performed sequentially. For example, procedure A can be performed first, followed by procedure B if procedure A does not successfully detect head-disk contact. Procedure A is an embodiment of a spike detection methodology, and procedure B is an embodiment of a traditional LFACH detection methodology. Procedure A involves measuring 508 an amplitude of a spike in the DC response signal, and calculating 510 a ratio between the spike amplitude and an amplitude of the DC response signal. The method involves determining 512 if the ratio exceeds a predetermined threshold, which is indicative of head-this contact. Procedure B involves monitoring 514 the measured DC response signal for a minima. The method also involves determining 516 if the minima has been detected, which is indicating head-this contact. The method further involves declaring 518 head-disk contact in response to the first of procedure A and procedure B to detect head-disk contact. The processes of FIG. 5 can be repeated to set clearance at different locations (e.g., ID, MD, OD) of the recording medium.

Figure 6:
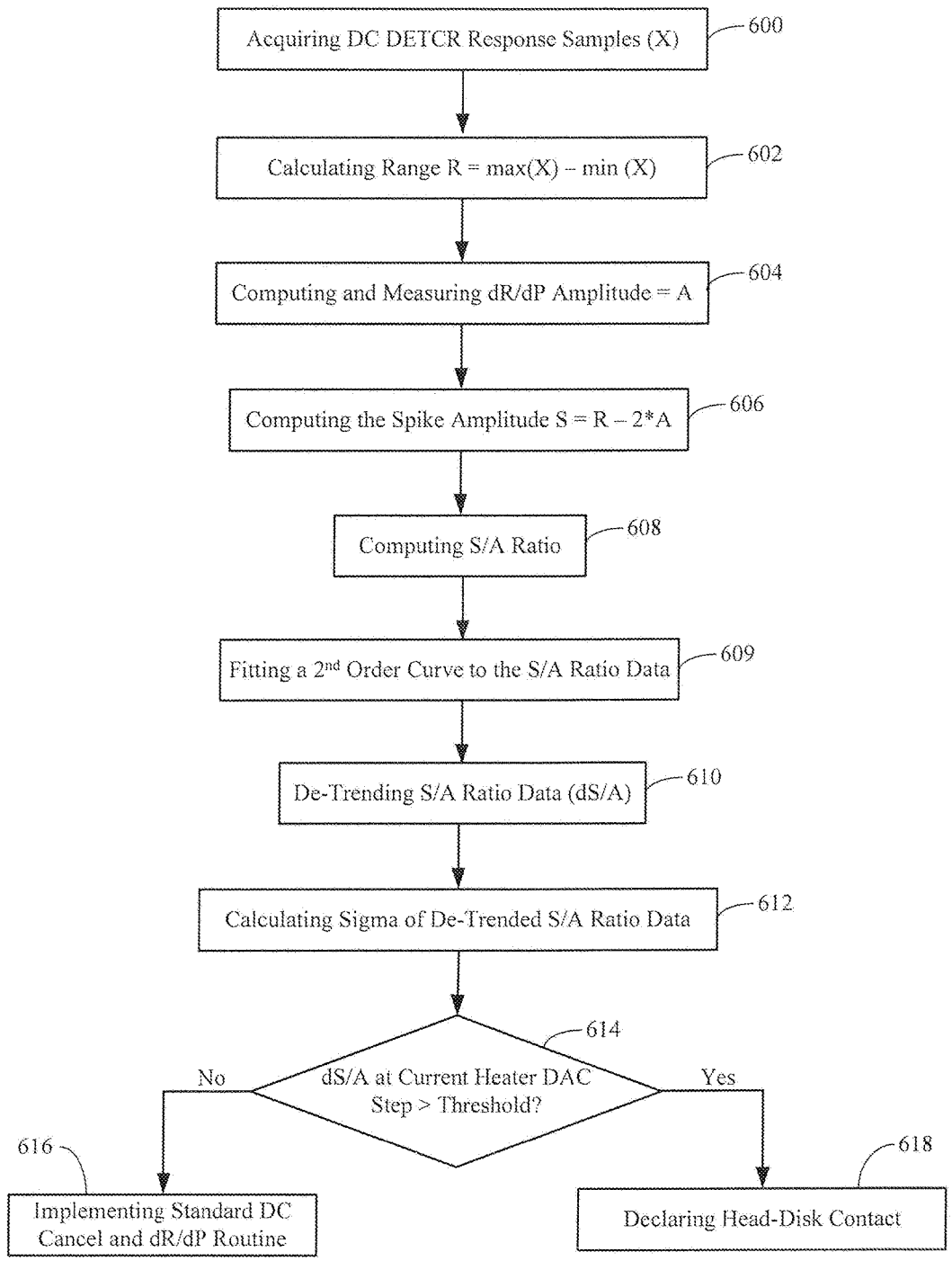
FIG. 6 is a flowchart illustrating various processes of a head-disk contact detection method in accordance with various embodiments.

FIG. 6 is a flowchart illustrating various processes of a head-disk contact detection method in accordance with various embodiments. The method shown in FIG. 6 involves acquiring 600 contact sensor response samples (X), such as those acquired from a DC DETCR. The method involves calculating 602 the measurable range, R, for the contact sensor response samples (X). For example, the range, R, can be calculated as R=max(X)−min(X). The method involves computing and measuring the amplitude, A, of the oscillating dR/dP signal. For example, a lock-in amplifier or algorithm in the detector can be used to measure the amplitude, A, at the frequency of the oscillating dR/dP signal (e.g., the frequency of the modulated power signal supplied to the heater). For purposes of this example, the dR/dP amplitude represents the center-to-peak amplitude of the dR/dP signal. The method also involves computing 606 the amplitude, S, of a spike in the DC DETCR signal. The spike amplitude, S, can be computed as S=R−2*A.

The method shown in FIG. 6 continues with computing 608 the S/A ratio as:

$$\frac{S}{A}\text{ratio} = \frac{R - 2*A}{2*A}$$

which reduces to:

$$\frac{S}{A}\text{ratio} = \frac{S}{2*A}.$$

Figure 7:
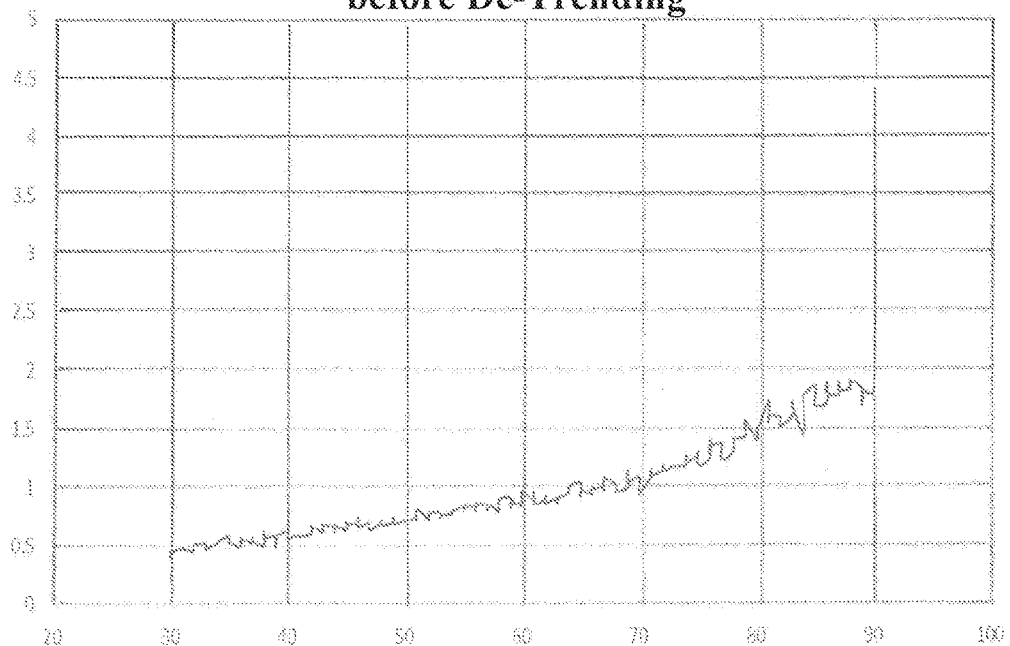
FIG. 7 shows a curve fitted to experimental head-disk contact data that exhibits a trend, T, according to various embodiments.

The method involves fitting 609 a second order curve to the S/A ratio data. As can be seen in FIG. 7, a slow ramping or trend, T, can be seen in the S/A ratio data. This ramping or trend, T, can be removed by subtracting the S/A ratio data with its second order curve fit from S/A ratio data prior to contact. This process is referred to as de-trending the S/A ratio data, which produces a head-disk contact signature with a very sharp transition. This can be seen in FIG. 8, which shows the de-trended S/A ratio data of FIG. 7.

Figure 8:
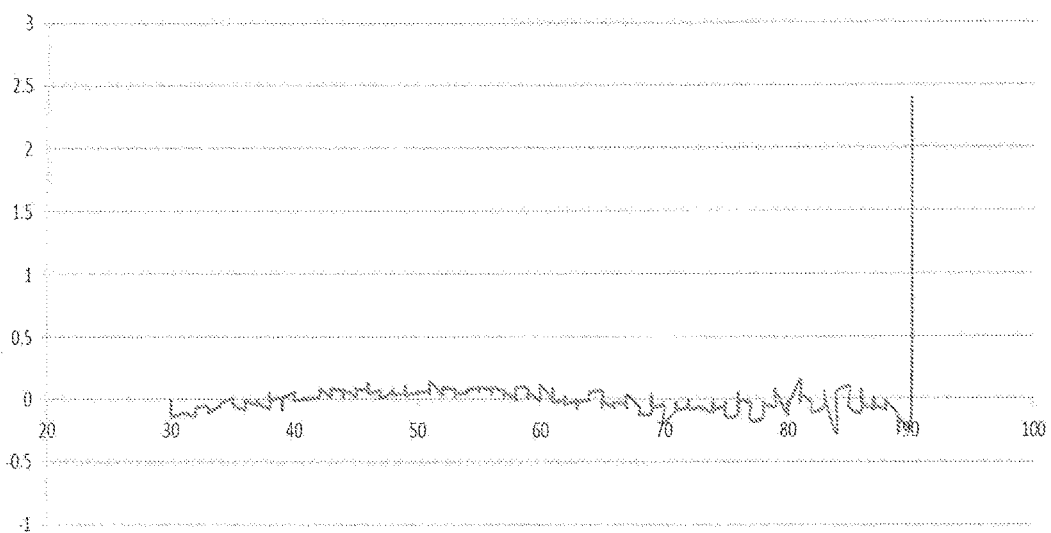
FIG. 8 shows the experimental data of FIG. 7 which has been de-trended according to various embodiments.

Referring again to FIG. 6, the method involves de-trending 610 the S/A ratio data (see e.g., FIG. 7) using the trend, T, to produce dS/A data (see, e.g., FIG. 8). The de-trended S/A ratio data can be computed as dS/A=S/A−T. The method also involves calculating 612 the standard deviation, sigma, of the de-trended S/A ratio data. A check 614 is made to determine if the de-trended S/A ratio data, dS/A, at the current heater DAC step exceeds a predetermined threshold. For example, the predetermined threshold can be a predefined number (e.g., 5) of standard deviations of the mean of the de-trended S/A ratio data, dS/A. As another example, the predetermined threshold can be a fixed threshold (e.g., a fixed percentage change in the de-trended S/A ratio data, dS/A). If dS/A at the current heater DAC step exceeds the predetermined threshold, head-disk contact is declared 618. If not, a standard DC Cancel and dR/dP contact detection routine can be implemented 616.

Figure 9:
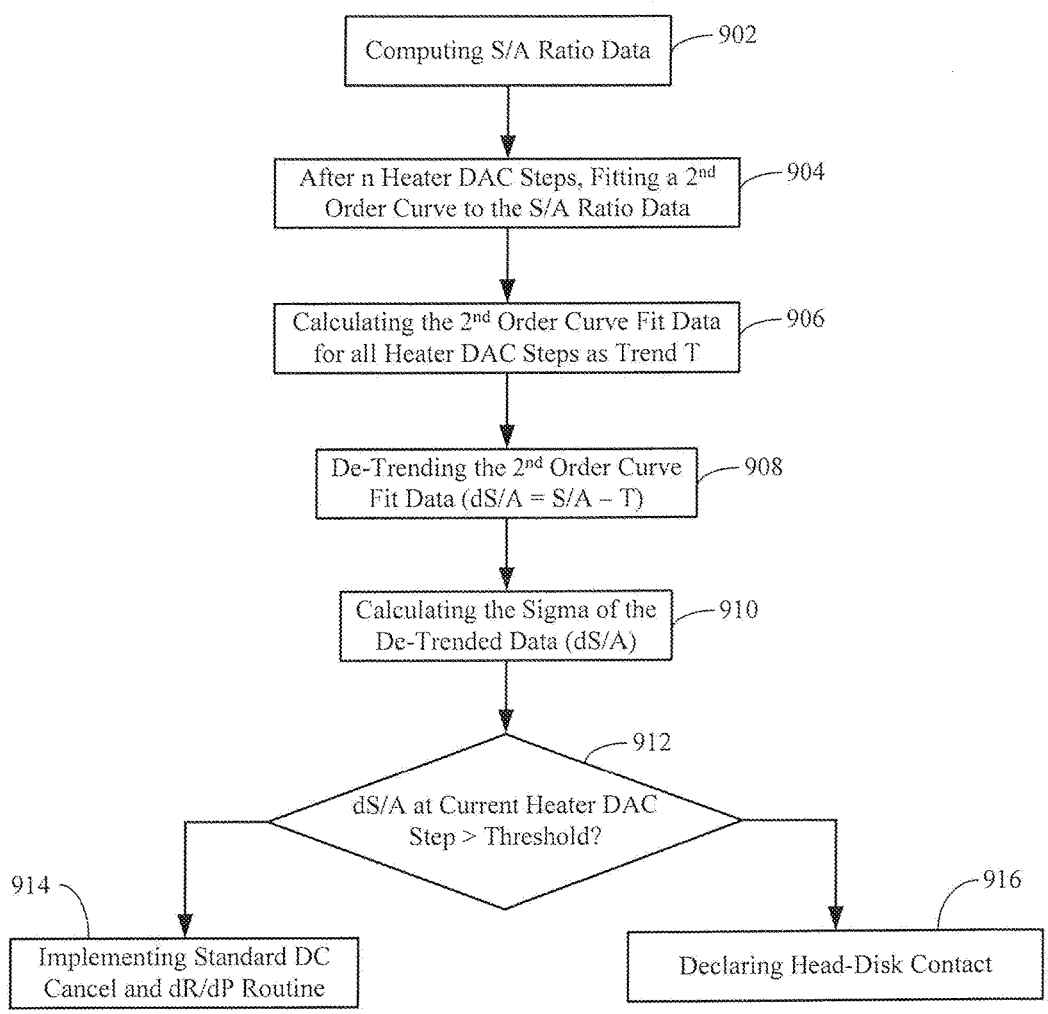
FIG. 9 illustrates various processes of the method shown in FIG. 8 in greater detail.

FIG. 9 illustrates various processes of the method shown in FIG. 8 in greater detail. In FIG. 9, it is assumed that the processes of blocks 600-606 in FIG. 8 have been performed. As such, FIG. 9 begins with computing 902 the S/A ratio data in a manner previously described. After an initial number, n, of heater DAC steps (e.g., 5 DAC steps), a second order curve is fitted 904 to the S/A ratio data. In some approaches, only the S/A ratio data two DAC steps prior to curve fitting are used. The method involves calculating 906 the second order curve fit data for all heater DAC steps as the trend T.

The method involves de-trending 908 the S/A ratio data using the trend, T, to produce dS/A data. As previously discussed, the de-trended S/A ratio data can be computed as dS/A=S/A−T. The method also involves calculating 910 the standard deviation, sigma, of the de-trended S/A ratio data. A check 912 is made to determine if the de-trended S/A ratio data, dS/A, at the current heater DAC step exceeds a predetermined threshold (e.g., 5σ or a fixed threshold). If dS/A at the current heater DAC step exceeds the predetermined threshold, head-disk contact is declared 916. If not, a standard DC Cancel and dR/dP contact detection routine can be implemented 914.

A contact detection procedure that incorporates spike detection of the present disclosure can be added to an existing LFACH contact detection methodology or be implemented as a standalone head-disk contact detector. For example, an LFACH contact detector that includes both a spike detector and a dR/dP detector provides comprehensive head-disk contact detection for both modulation and non-/low-modulation air bearings. A spike detector of the present disclosure can declare head-disk contact in a fraction of revolutions during the peak cycle of heater oscillation. This makes contact detection very fast and less prone to burnishing. A spike detector of the present disclosure can be used in the field to check clearance margin and to adjust for clearance drift. In a field application, for example, spike detection can be performed periodically or at the moment other drive fault events occur or during dramatic environmental changes. Spike detection in the field can be performed at a predetermined safe minimum clearance. If spike detection does not show signs of head-disk contact, this indicates that the drive is operating at safe clearance. If the spike detector detects head-disk contact, this indicates that clearance has drifted lower and measures have to be taken to adjust clearance to a higher safe level.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
moving a magnetic recording slider relative to a magnetic recording medium;
supplying AC power to a heater of the slider to cause oscillation in a spacing between the slider and the medium and to cause the slider to approach the medium;
measuring an amplitude of DC response signals produced by a contact sensor of the slider as the slider approaches the medium;
measuring an amplitude of a spike in the DC response signals;
calculating a ratio between the spike amplitude and the amplitudes of the DC response signals; and
detecting contact between the slider and the medium in response to the ratio exceeding a predetermined threshold.

2. The method of claim 1, wherein:
the DC response signals have a measureable range, R; and
the amplitude of the spike is measured by subtracting an amplitude of the DC response signals from the range, R.

3. The method of claim 1, wherein:
the amplitudes of the DC response signals are defined as center-to-peak amplitudes;
the DC response signals have a measureable range, R; and
the amplitude of the spike is measured by subtracting twice the center-to-peak amplitude of the DC response signals from the range, R.

4. The method of claim 1, further comprising:
calculating a trend, T, using calculated ratios for a plurality of heater power steps;
de-trending the calculated ratios using the trend, T; and
detecting contact between the slider and the medium in response to a de-trended ratio exceeding the predetermined threshold.

5. The method of claim 1, wherein measuring the amplitude of the DC response signals comprises:
calculating an amplitude of a dR/dP curve developed using the DC response signals, where dR is a change in resistance of the contact sensor and dP is a change in heater power; and
calculating the ratio comprises calculating the ratio between the spike amplitude and the amplitude of the dR/dP curve.

6. The method of claim 5, wherein the amplitude of the dR/dP curve comprises the center-to-peak amplitude of the dR/dP curve.

7. The method of claim 1, further comprising:
calculating an amplitude of a dR/dP curve developed using the DC response signals, where dR is a change in resistance of the contact sensor and dP is a change in heater power;
detecting a minima of the dR/dP curve; and
detecting contact between the slider and the medium in response to either the ratio exceeding the predetermined threshold or detecting the minima of the dR/dP curve.

8. The method of claim 7, wherein detecting contact in response to the ratio exceeding the predetermined threshold and detecting contact in response to detecting the minima of the dR/dP curve occurs concurrently.

9. The method of claim 7, wherein detecting contact in response to the ratio exceeding the predetermined threshold and detecting contact in response to detecting the minima of the dR/dP curve occurs sequentially.

10. An apparatus, comprising:
a slider configured for writing data to and reading data from a magnetic recording medium, the slider configured for heat-assisted magnetic recording and comprising:
a heater configured to receive an AC signal and to cause oscillation in a spacing between the slider and the medium; and
a contact sensor situated on the slider and configured to produce a DC response signal; and
a detector coupled to the slider and configured to measure an amplitude of a spike in the DC response signal, calculate a ratio between the spike amplitude and an amplitude of the DC response signal, and detect contact between the slider and the medium in response to the ratio exceeding a predetermined threshold.

11. The apparatus of claim 10, wherein:
the DC response signals have a measureable range, R; and
the detector is configured to measure the amplitude of the spike by subtracting an amplitude of the DC response signals from the range, R.

12. The apparatus of claim 10, wherein:
the amplitudes of the DC response signals are defined as a center-to-peak amplitudes;
the DC response signals have a measureable range, R; and
the detector is configured to measure the amplitude of the spike by subtracting twice the center-to-peak amplitude of the DC response signals from the range, R.

13. The apparatus of claim 10, wherein the detector is configured to calculate a trend, T, using calculated ratios for a plurality of heater power steps, de-trend the calculated ratios using the trend, T, and detect contact between the slider and the medium in response to a de-trended ratio exceeding the predetermined threshold.

14. The apparatus of claim 10, wherein the detector is configured to:
calculate an amplitude of a dR/dP curve developed using the DC response signals, where dR is a change in resistance of the contact sensor and dP is a change in heater power; and
calculate the ratio as a ratio between the spike amplitude and the amplitude of the dR/dP curve.

15. The apparatus of claim 14, wherein the amplitude of the dR/dP curve comprises the center-to-peak amplitude of the dR/dP curve.

16. An apparatus, comprising:
a slider configured for writing data to and reading data from a magnetic recording medium, the slider configured for heat-assisted magnetic recording and comprising:
a heater configured to receive an AC signal and to cause oscillation in a spacing between the slider and the medium; and
a contact sensor situated on the slider and configured to produce a DC response signal; and
a detector coupled to the slider and configured to:
calculate an amplitude of a dR/dP curve developed using the DC response signals, where dR is a change in resistance of the contact sensor and dP is a change in heater power;
measure an amplitude of a spike in the DC response signal;
calculate the ratio as a ratio between the spike amplitude and the amplitude of the dR/dP curve;
detect a minima of the dR/dP curve; and
detect contact between the slider and the medium in response to either the ratio exceeding the predetermined threshold or detecting the minima of the dR/dP curve.

17. The apparatus of claim 16, wherein the detector is configured to concurrently detect contact in response to the ratio exceeding the predetermined threshold and detect contact in response to detecting the minima of the dR/dP curve.

18. The apparatus of claim 16, wherein the detector is configured to sequentially detect contact in response to the ratio exceeding the predetermined threshold and detect contact in response to detecting the minima of the dR/dP curve.

19. The apparatus of claim 16, wherein:
the DC response signals have a measureable range, R; and
the detector is configured to measure the amplitude of the spike by subtracting an amplitude of the dR/dP curve from the range, R.

20. The apparatus of claim 16, wherein:
the dR/dP curve has an amplitude defined as a center-to-peak amplitude;
the DC response signals have a measureable range, R; and
the detector is configured to measure the amplitude of the spike by subtracting twice the center-to-peak amplitude of the dR/dP curve from the range, R.

21. The apparatus of claim 16, wherein the detector is configured to:
calculate a trend, T, using calculated ratios for a plurality of heater power steps;
de-trend the calculated ratios using the trend, T; and
detect contact between the slider and the medium in response to a de-trended ratio exceeding the predetermined threshold.

* * * * *